3,759,891
(1-β-ALANINE, 15-ORNITHINE)-CORTICOTROPIN PEPTIDES
Hideo Otsuka, Mino, and Ken Inouye, Kobe, Japan, assignors to Shionogi & Co., Ltd., Osaka, Japan
No Drawing. Filed Mar. 22, 1971, Ser. No. 127,000
Claims priority, application Japan, Mar. 24, 1970, 45/2,554
Int. Cl. C07c 103/52; C07g 7/00; C08h 1/00
U.S. Cl. 260—112.5                                                 2 Claims

ABSTRACT OF THE DISCLOSURE

Corticotropically active octadecapeptides wherein the first amino acid, serine, and the fifteenth amino acid, lysine, in the native corticotropin molecule are substituted respectively by β-alanine and ornithine, derivatives thereof, non-toxic acid addition salts thereof and complexes thereof are disclosed. Such peptides are useful as a medicament, because they show corticotropic properties remarkably improved in prolongation of action. They can be prepared by condensing the amino acids together one by one or by condensing the small peptide fragments together in a per se conventional manner.

---

This invention relates to novel octadecapeptides having a β-alanine residue at the N-terminal and an L-ornithine residue at the position 15, respectively in place of the serine residue and the lysine residue in native corticotropin, derivatives thereof, non-toxic acid addition salts thereof and complexes thereof. The [1-β-alanine, 15-ornithine]-octadecapeptides (hereinafter referred to as [β-Ala$^1$,Orn$^{15}$]-octadecapeptides) prepared by the present invention are useful as a medicament, because they show marked corticotropin activities such as adrenal-stimulating activity, lipotropic activity or melanocyte-stimulating activity, and these activities are notably long-acting.

In 1965, the synthesis of octadecapeptides,

ACTH(1–18)—OH and ACTH(1–19)—NH$_2$, corresponding to the first eighteen amino acid residues of corticotropin (ACTH) was reported by the present inventors and co-workers [Biochem. (Tokyo) 58 512 (1965)]. Later, the synthesis of the 1-glycine analog, i.e. Gly$^1$—ACTH(1–18)—NH$_2$ was reported in Bull. Chem. Soc. Japan 43 196 (1970). From these synthetic and biological studies on corticotropin peptides, the present inventors have learned that the amino-terminal eighteen residues fulfill the minimal requirements for eliciting high adrenal-stimulating activity. The ACTH(1–18)—NH$_2$ and Gly$^1$—ACTH(1–18)—NH$_2$ were, however, found to be much less active than the native hormone, especially when they were administered for assays by subcutaneous or intravenous routes. Recently, an excellent corticotropin peptide, i.e.

β-Ala$^1$—ACTN(1–18)—NH$_2$ was reported by the present inventors et al. [Bull. Chem. Soc. Japan 43 1163 (1970)]. This peptide possesses biological properties remarkably improved in enhancement of potency, due to the decreased susceptibility toward the action of intracellular aminopeptidase. The amino-terminal substitution by β-alanine improved the stability of peptide in tissue, but not the stability in blood. In fact, the action of 1-β-alanine analog in blood is less durable than that of the native conticotropin, indicating that the former is inactivated faster than the latter by the action of endopeptidase in blood, when administered by intravenous routes. Thus, a further improvement in allowing the short-chain peptide to come closer to the native corticotropin has earnestly been desired, from the view points of industrial production and practical use.

As a result of the investigations on corticotropin peptides, it has been discovered by the present inventors that the [β-Ala$^1$,Orn$^{15}$]-octadecapeptides have their biological properties improved in the duration of action and that they possess the same level of adrenal-stimulating activity as the natural corticotropin. It has been also discovered that such improved properties are due to the decreased susceptibility of the [β-Ala$^1$,Orn$^{15}$]-octadecapeptides, toward the action of endopeptidase in the blood and aminopeptidase in the tissue. The present invention is based on these discoveries.

According to the invention, the [β-Ala$^1$,Orn$^{15}$]-octadecapeptides can be prepared by condensing the amino acids together one by one or by condensing the small peptide fragments together in a per se conventional manner. More particularly, they can be prepared by (a) reacting an amino acid ester or peptide ester having a free amino group with other amino acid or peptide ester having protected amino group(s) in the presence of a condensing agent, or (b) reacting an amino acid or peptide having a free amino group and protected or unprotected carboxyl groups(s) with other amino acid or peptide having an activated carboxyl group and protected amino group(s), or (c) reacting an amino acid or peptide having a free carboxyl group and protected amino group(s) with other amino acid or peptide having an activated amino group and protected carboxyl group(s) and removing the protecting groups from the resulting protected peptide by hydrogeneolysis, acidolysis, alkali saponification, hydrazinolysis or sodium in liquid ammonia reduction.

Condensation for peptide bond formation may be performed by the usual methods. Examples of said methods are the azide method, the dicyclohexylcarbodiimide method, the carbonyldiimidazole method, the mixed anhydride method, the activated ester method (e.g. p-nitrophenyl ester method, N-hydroxysuccinimide ester method, pentachlorophenyl ester method, cyanomethyl ester method, p-nitrophenyl thiolester method), the isoxazolium method, the N-carboxyanhydride method, the tetraethyl pyrophosphite method, the ethyl chlorophosphite method, a combined method thereof and the other methods usually employed in the art. The desired octadecapeptides are also prepared by the so-called solid phase peptide synthesis. Although above-mentioned methods can be employed for the formation of any peptide bond in preparing the present octadecapeptides, the most commonly practiced methods are the activated ester method, the dicyclohexylcarbodiimide method, the azide method and the mixed anhydride method.

In the production of the [β-Ala$^1$,Orn$^{15}$]-octadecapeptides, any free functional groups not participating in the reaction are advantageously protected, especially by such groups that can be easily removed by hydrogenolysis, acidolysis, alkali saponification, hydrazinolysis or sodium in liquid ammonia reduction. The carboxyl group is advantageously protected by esterification, for example, with a lower alkanol (e.g. methanol, ethanol, propanol, isopropanol, t-butanol) or an aralkanol (e.g. benzyl alcohol, p-nitrobenzyl alcohol, p-methoxybenzyl alcohol) or by amide formation. These carboxyl-protecting groups are introduced by the usual methods.

The amino group is protected preferably by introducing a group such as t-butyloxycarbonyl group, t-amyloxycarbonyl group, o-nitrophenylsulfenyl group, 2-(p-diphenyl)-isopropyloxycarbonyl group, benzyloxycarbonyl group, p-nitrobenzyloxycarbonyl group, tosyl group, formyl group or trityl group, in a conventional manner. For protection of the guanidyl group of arginine, nitro group, tosyl group or adamantyloxycarbonyl group is preferably employed, but the protection of the guanidyl group is not always necessary. The γ-carboxyl group of glutamic acid is preferably protected by such carboxyl-protecting groups as those mentioned above, and the ω-amino group of lysine or ornithine is advantageously protected by such amino-protecting groups as those mentioned above. The imidazole group of histidine may be protected by tosyl group, benzyloxycarbonyl group or benzyl group. Further, the hydroxyl group of serine or tyrosine may be protected by acetyl group, benzyl group or t-butyl group, but such protection is not always necessary.

In addition to the amino acid residues at amino-terminal and at position 15, some other residues of the amino acid sequence of corticotropin peptide may be further replaced by other different amino, acids, without impairing substantially the corticotropic activity. For example, the fourth amino acid, methionine, may be replaced by norvaline, norleucine, leucine or α-aminobutyric acid and/or the fifth amino acid, glutamic acid, may be replaced by glutamine.

Accordingly, the present octadecapeptides are represented by the Formula I: β-alanyl-L-tyrosyl-L-seryl-X-Y-L-histidyl - L - phenylalanyl - L - arginyl-L-tryptophyl-glycyl - L - lysyl - L - prolyl - L - valyl-glycyl-L-ornithyl-L - lysyl - L - arginyl-Z wherein X is L-methionine residue, L-norvaline residue, L-norleucine residue, L-leucine residue or α-aminobutyric acid residue; Y is L-glutamic acid residue or L-glutamine residue and Z is L-arginine residue, L-arginine ester residue or L-arginine amide residue.

The final coupling reaction for producing the peptide (I) is performed, for example, by condensing a protected decapeptide of the formula: $R_1$-β-alanyl-L-tyrosyl-L-seryl-X - γ - $R_2$ - L - glutamyl-L-histidyl-L-phenylalanyl-L-arginyl-L-tryptophyl-glycine wherein $R_1$ is an amino-protecting group; X is L-methionine residue, L-norvaline residue, L-norleucine residue, L-leucine residue or α-aminobutyric acid residue and $R_2$ is a carboxyl-protecting group, with a protected octapeptide of the formula: $N^\epsilon$-$R_3$-L-lysyl - L - prolyl - L-valyl-glycyl-$N^\delta$-$R_4$-L-ornithyl-$N^\epsilon$-$R_5$-L-lysyl-L-arginyl-Z wherein $R_3$, $R_4$ and $R_5$ each is an amino-protecting group and Z is L-arginine residue, L-arginine ester residue or L-arginine amide residue, by the activated ester method, the dicyclohexylcarbodiimide method, the azide method, the mixed anhydride method or a combined method thereof in an inert solvent at a temperature of −20° C. to 60° C. for about 2 hours to 7 days, and removing the protecting groups from the resulting protected octadecapeptide of the formula: $R_1$-β-alanyl - L - tyrosyl - L-seryl-X-γ-$R_2$-L-glutamyl-L-histidyl-L - phenylalanyl - L - arginyl-L-tryptophyl-glycyl-$N^\epsilon$-$R_3$-L-lysyl - prolyl - L-valyl-glycyl-Nδ-$R_4$-L-ornithyl-$N^\epsilon$-$R_5$-L-lysyl-L-arginyl-Z wherein $R_1$, X, $R_2$, $R_3$, $R_4$, $R_5$ and Z each has the same meaning as defined above, by hydrogenolysis, acidolysis, alkali saponification, hydrazinolysis or sodium in liquid ammonia reduction at a temperature of about −20° C. to 60° C. for 30 minutes to 24 hours. The inert solvents are dimethylformamide, dimethylsulfoxide, dioxane, hexamethyl phosphortriamide, aqueous solvent thereof and a mixture thereof.

The preferred procedures for the preparation of the [β-Ala¹,Orn¹⁵]-octadecapeptides are shown in charts I, II, III and IV.

Chart I

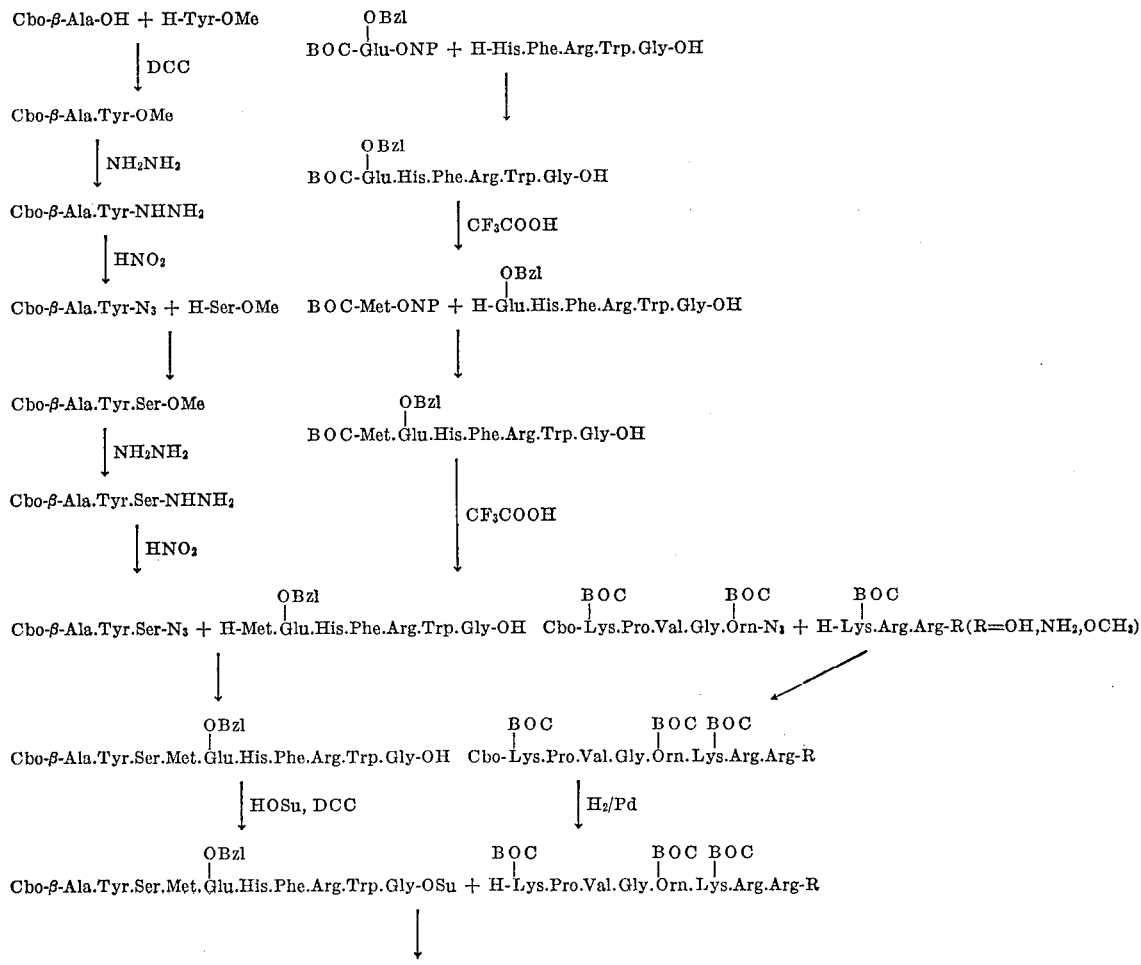

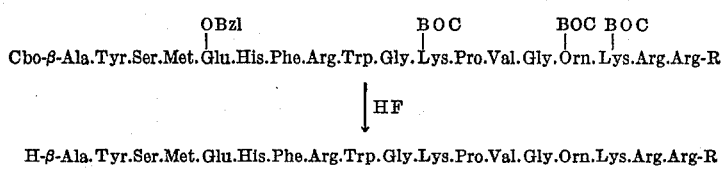
H-β-Ala.Tyr.Ser.Met.Glu.His.Phe.Arg.Trp.Gly.Lys.Pro.Val.Gly.Orn.Lys.Arg.Arg-R
Chart II
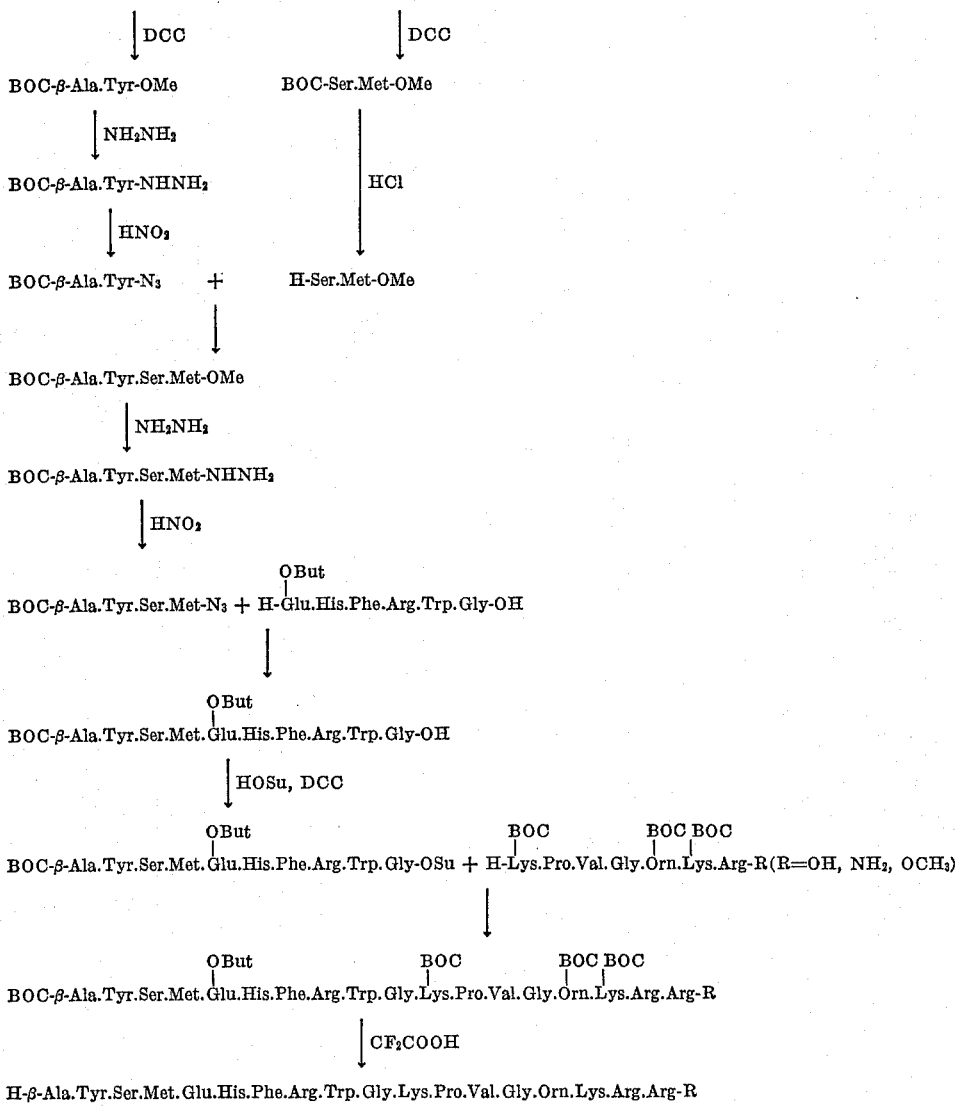
CHART III
Cbo-β-Ala.Tyr-NHNH₂
↓ HNO₂
Cbo-β-Ala.Tyr-N₃ + H-Ser.Met-OMe
↓
Cbo-β-Ala.Tyr.Ser.Met-OMe
↓ NH₂NH₂

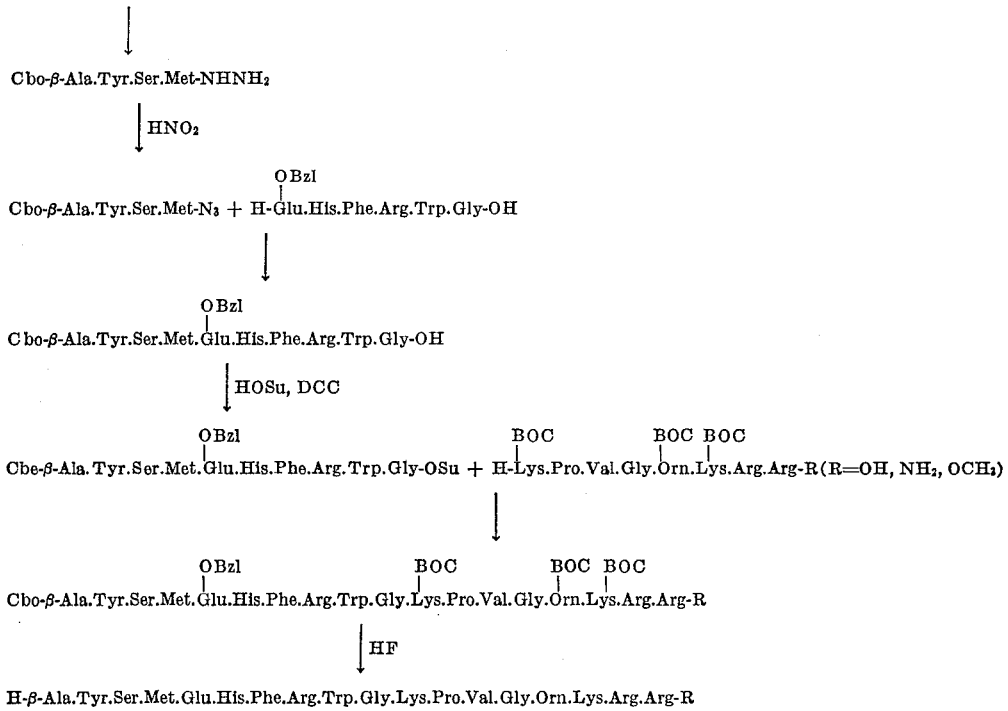

CHART IV

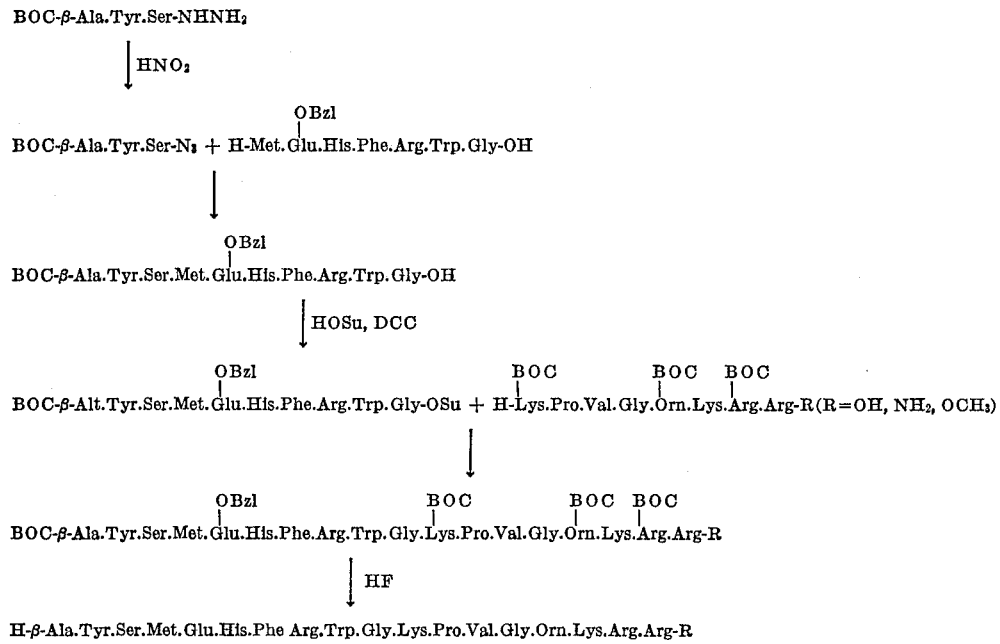

H-β-Ala.Tyr.Ser.Met.Glu.His.Phe Arg.Trp.Gly.Lys.Pro.Val.Gly.Orn.Lys.Arg.Arg-R

In the charts, the following abbreviations are used: β-Ala=β-alanine residue, Tyr=L-tyrosine residue, Ser =L-serine residue, Met=L-methionine residue, Glu=glutamic acid residue, His=L-histidine residue, Phe=L-phenylalanine residue, Arg=L-arginine residue, Trp=L-tryptophan residue, Gly=glycine residue, Lys=L-lysine residue, Pro=L-proline residue, Val=L-valine residue, Orn=L-ornithine residue, Cbo=benzyloxycarbonyl, BOC =t-butyloxycarbonyl, Bzl=benzyl, OBu$^t$=t-butoxy, DCC =N,N' - dicyclohexylcarbodiimide, HOSu=N-hydroxysuccinimide, ONP=p-nitrophenoxy.

As shown in the charts, the preferred process involves the coupling of the tripeptide containing the first 3 amino acids, i.e. β-alanyl-L-tyrosyl-L-serine or the tetrapeptide, i.e. β-alanyl-L-tyrosyl-L-seryl-L-methionine with the heptapeptide or the hexapeptide corresponding to the position 4–10 or 5–10 respectively, preferably by the azide method, whereupon the resulting decapeptide is condensed with the peptide corresponding to the rest of molecule (positions 11–18), preferably by the activated ester method.

Although the above mentioned procedure is the preferred one for the production of the present corticotropin peptides, it is possible to substitute the protecting groups, the coupling methods or the deprotection methods used above, for the equivalents or the equivalent methods and to change the selection of fragment peptides and coupling order appropriately.

Protecting groups employed in the present invention can be removed by hydrogenolysis, alkali saponification, hydroazinolysis, sodium in liquid ammonia reduction or by treatment with an acid such as trifluoroacetic acid, formic acid, hydrogen halide (e.g. hydrogen fluoride, hydrogen bromide, hydrogen chloride), hydrohalic acid (e.g. hydrofluoric acid, hydrobromic acid, hydrochloric acid) or a mixture thereof, in a conventional manner, depending on the nature of the group.

The [β-Ala$^1$,Orn$^{15}$]-octadecapeptides prepared by the present invention can be purified by methods known per se such as column chromatopraphy with ion-exchange resin, ion-exchange cellulose or Sephadex or countercurrent distribution method.

The [β-Ala$^1$,Orn$^{15}$]-octadecapeptides of the invention are produced in the form of base or of pharmaceutically acceptable non-toxic acid addition salt, depending on the reaction conditions used. Also, said salts can be prepared by treating the octadecapeptides with inorganic acids such as hydrohalic acid (e.g. hydrofluoric acid, hydrobromic acid, hydrochloric acid), hydrogen halide (e.g. hydrogen fluoride, hydrogen bromide, hydrogen chloride), sulfuric acid or phosphoric acid, or with organic acids such as acetic acid, formic acid, propionic acid, glycolic acid, lactic acid, pyruvic, oxalic acid, malonic acid, succinic acid, maleic acid, fumaric acid, tartaric acid, citric acid, benzoic acid, methanesulfonic acid, benzenesulfonic acid or toluenesulfonic acid, in a conventional manner. An equimolar or excess amount of the acid may be used in such salt formation.

The [β-Ala$^1$,Orn$^{15}$]-octadecapeptides thus obtained have a high corticotropic activity and they are excellent in prolongation of action. The half-life in plasma is longer than that of the native corticotropin. Detailed studies on the biological properties of the [β-Ala$^1$,Orn$^{15}$]-octadecapeptides will be hereinafter disclosed, using [β-Ala$^1$,Orn$^{15}$]—ACTH(1–18)—NH$_2$ as a test peptide.

Biological half-life of the [β-Ala$^1$Orn$^{15}$]—ACTH(1–18)—NH$_2$ was determined with the in vitro lipotropic activity [A. Tanaka, B. T. Pickering and C. H. Li, Arch. Biochem. Biophys. 99 294 (1962)] as a parameter. The results are summarized in Table 1, being compared with natural corticotropin (sheep; α$_s$-ACTH), β-Ala$^1$—ACTH(1–18)—NH$_2$ and Gly$^1$—ACTH(1–18)—NH$_2$.

TABLE 1.—HALF-LIFE OF CORTICOTROPIN AND RELATED SYNTHETIC PEPTIDES AS IN VITRO LIPOTROPIC AGENTS

| Peptide | In vivo a (intravenous injection), minutes | In vitro b incubated with plasma, minutes |
| --- | --- | --- |
| [β-Ala$^1$,Orn$^{15}$]-ACTH(1–18)-NH$_2$ | 4.5 | 76.1 |
| α$_s$-ACTH | 4.4 | 59.2 |
| β-Ala$^1$-ACTH(1–18)-NH$_2$ | 3.1 | 35.4 |
| Gly$^1$-ACTH(1–18)-NH$_2$ | 2.0 | 30.0 | a A peptide sample was injected intravenously into vena cava inferior of rats, and blood samples, which were collected from abdominal aorta in appropriate time intervals and were acidified, were assayed for the in vitro lipotropic activity.
b A sample was dissolved in the fresh plasma from anesthetized rat and the mixture was then incubated at 37° C. The aliquots taken from the mixture in appropriate time intervals were assayed for the in vitro lipotropic activity.

The data listed above clearly show that the half-life of the [β-Ala$^1$,Orn$^{15}$]—ACTH(1–18)—NH$_2$ of the invention is almost the same as that of the natural corticotropin and is longer than that of related peptides, when administered by intravenous injection. Further, the half-life of the [β-Ala$^1$,Orn$^{15}$]—ACTH(1–18)—NH$_2$ is much longer than that of the natural corticotropin and related octadecapeptides, when incubated with plasma in vitro. The prolonged duration of activity on the present octadecapeptides is due to the increased resistance of the peptide toward the action of endopeptidase in the blood.

The adrenal-stimulating activities of the [β-Ala$^1$,Orn$^{15}$]-octadecapeptides were assayed according to the four different methods and they were compared with those of the native sheep corticotropin (α$_s$-ACTH). The in vivo steroidogenic activity by the intravenous administration to hypophysectomized rat was assayed by the method of Lipscomb and Nelson [Endocrinol. 71 13 (1962)] with a minor modification [A. Tanaka and C. H. Li, Endocrinol. Japonica 13 180 (1966)]. The in vivo steroidogenic activity was also assayed in the dexamethasone-pentobarbital-primed mouse [A. Tanaka and N. Nakamura, "Integrative Mechanism of Neuroendocrine System," Hokkaido University Medical Library Series 1 49 (1968)]. In addition, the steroidogenic activity by the intramuscular administration to hypophysectomized rat was determined, where a peptide preparation was injected into the thigh muscle and a blood sample was collected from the abdominal aorta 30 minutes after injection. Further, the steroidogenic activity by the intravenous administration to hypophysectomized rat was determined in such a manner that a peptide preparation was injected into the femoral vein and a blood sample was collected from the abdominal aorta 30 minutes after injection. Throughout the experiments, the Third USP Corticotropin Reference Standard was used as a standard and the production of 11-hydroxycorticosteroids (11-OHCS) was determined by the fluorophotometric method of Peterson [J. Biol. Chem. 225 25 (1957)]. For each assay method several determinations were usually performed and the data obtained independently were submitted to the statistical treatment by Sheps and Moore procedure [J. Pharmacol. Extl. Therap. 128 99 (1960)]. The results of these assays on the [β-Ala$^1$,Orn$^{15}$]—ACTH(1–18)—NH$_2$ are given in Table 2, being compared with those of the natural corticotropin (α$_s$-ACTH).

TABLE 2.—ADRENAL-STIMULATING ACTIVITY OF OCTADECAPEPTIDE AND NATURAL CORTICOTROPIN

| Method | Administration route | Peptide [β-Ala$^1$,Orn$^{15}$]-ACTH(1–18)—NH$_2$ | α$_s$-ACT |
| --- | --- | --- | --- |
| In vivo steroidogenesis in: | | | |
| Adrenal-cannulation. | Intravenous | 145 | |
| Dexamethasone nembutal-blocked mouse. | do | 162 | 100–180 |
| Peripheral blood. | do | 160 | |
| Do | do | 86 | |

NOTE.—The activities are expressed in USP unit/mg., relative to the Third USP Corticotropin Reference Standard.

The adrenal-stimulating activities of the

[β-Ala$^1$,Orn$^{15}$]—ACTH(1–18)—NH$_2$ are almost the same as those of the natural corticotropin. The octadecapeptide of the invention shows a high lipotropic activity, which is summarized in Table 3 and compared with that of natural corticotropin (α$_s$-ACTH).

TABLE 3.—LIPOTROPIC ACTIVITY OF OCTADECAPEPTIDE AND NATURAL CORTICOTROPIN

| Test animal | Minimum effective dose (10$^{-6}$ mg./50 mg. tissue) | |
| --- | --- | --- |
| | [β-Ala$^1$,Orn$^{15}$]-ACTH(1–18)—NH$_2$ | α$_s$-ACTH |
| Rat adipose tissue | 0.35 | 6.0 |
| Rabbit adipose tissue | 0.10 | 7.1 |

Note.—The lipotropic activity was determined according to the method described by Tanaka et al. [Arch. Biochem. Biophys. 99 294 (1962)], with the rat epididymal and the rabbit perirenal adipose tissue. The increase of non-esterified fatty acid concentration in both medium and tissue is the parameter. The activity is expressed in terms of the minimal effective dose per 50 mg. tissue.

Assay for the in vitro melanocyte-stimulating activity of [β-Ala$^1$,Orn$^{15}$]—ACTH(1–18)—NH$_2$ was carried out according to the method by K. Shizume, A. B. Lerner and T. B. Fitzpatrick [Endocrinol. 54 553 (1954)], using isolated skin fragments of Rana pipiens frogs. The melanocyte-stimulating activity of the present octadecapeptide was found to be 0.7×10$^{10}$ U./g. A pure preparation of native α-melanocyte-stimulating hormone was used as a standard.

The [β-Ala$^1$,Orn$^{15}$]-octadecapeptides of the invention can be converted into the corresponding complex with a complex-forming heavy metal (e.g. zinc, copper, iron, nickel, cobalt), a complex-forming polyamino acid (e.g. poly-glutamic acid, poly-aspartic acid, copoly-glutamyl-tyrosine, copoly-aspartyl-glutamic acid) or with a mixture thereof. The complex shows an excellent long-acting property over the plain peptide. The heavy metal complex can be prepared by treating the octadecapeptide with a heavy metal compound such as heavy metal halide (e.g. zinc chloride, copper chloride, iron chloride, cobalt chloride, nickel chloride), acetate (e.g. zinc acetate), sulfate (e.g. zinc sulfate) or hydroxide (e.g. zinc hydroxide) in an approximate proportion of 1:0.1–100 by weight under weakly acidic condition, preferably at pH 6.5 to 7.0, in a conventional manner. Among the heavy metals, zinc is most preferred. The polyamino acid complex can be prepared by treating the present octadecapeptide with a polyamino acid in an approximate proportion of 1:0.1–100 by weight under weakly acidic condition, preferably at pH 6.5 to 7.0, in a conventional manner. The polyamino acids used are homopolymer or copolymer of amino acids and they may be of L-, D-, or DL-configuration. Examples of the preferred polyamino acids are poly-L-glutamic acid, poly-D-glutamic acid, poly-DL-glutamic acid, poly-L-aspartic acid, poly-D-aspartic acid, poly-DL-aspartic acid, copoly-L-glutamyl-L-tyrosine and copoly-L-aspartyl-L-glutamic acid. Preferred molecular weight of the polyamino acid is approximately 1,000 to 100,000, particularly 2,000 to 6,000. It is preferred to use the polyamino acid which has been previously neutralized with an alkali (e.g. sodium hydroxide). Other suitable additives such as preservative (e.g. benzyl alcohol, phenol, thimerosal), buffer (e.g. phosphate, carbonate, citrate) or isotonizing agent (e.g. sodium chloride) may be added to the preparation of the complex.

It should be noted that the test data described above are shown only as examples. Since the other [$\beta$-Ala$^1$, Orn$^{15}$]-octadecapeptides have almost the same characteristics and advantages as medicament, as does the

[$\beta$-Ala$^1$,Orn$^{15}$]—ACTH(1–18)—NH$_2$ described above, the [$\beta$-Ala$^1$,Orn$^{15}$]-octadecapeptides of the invention are highly useful and advantageous for the therapeutical purposes, e.g. treatment of acute or chronic articular rheumatisms, allergic diseases or adrenarches of human beings and domestic animals, or for the test of adrenocortical function.

Thus, the [$\beta$-Ala$^1$,Orn$^{15}$]-octadecapeptides, the acid addition salts and the complexes can be administered orally or parenterally in per se conventional forms, e.g. injection, liquid, suspension, emulsion or aerosol, optionally with suitable carriers, stabilizers, emulsifiers, preservatives, buffers, isotonizing agents and/or wetting agents, where a therapeutically effective amount of the active ingredient is contained.

The effective dose can be easily determined by the physicians on the basis of the data hereindescribed. For example, a typical clinical dose range of the present octadecapeptides is approximately 0.2 U./kg. to 0.8 U./kg. for a normal adult. The octadecapeptide is advantageously administered in the dosage form of an injection, and administration is repeated as often as required in accordance with the physician's indication.

The following examples are given solely for the purpose of illustration and are not to be construed as limitation of this invention, many variations of which are possible.

EXAMPLE 1

(a) Benzyloxycarbonyl-$\beta$-alanyl-L-tyrosine methyl ester

To a solution of benzoyloxycarbonyl-$\beta$-alanine (8.9 g.) and L-tyrosine methyl ester (7.8 g.) in acetonitrile is added a solution of N,N'-dicyclohexylcarbodiimide (8.3 g.) in dichloromethane at 0° C. The mixture is allowed to stand overnight at 0° C., and dicyclohexylurea precipitated is removed by filtration. The filtrate is concentrated under reduced pressure to give a residue, which is dissolved in ethyl acetate. The solution is washed with N hydrochloric acid and 5% sodium hydrogen carbonate, dried over sodium sulfate and concentrated under reduced pressure to give a sirupy residue, which is crystallized from ethyl acetate. Recrystallization from the same solvent gives the desired product (13.2 g.), melting at 114–116° C. $[\alpha]_D^{27}+6.2\pm0.4°$ (c.=1.040, methanol).

*Analysis.*—Calcd. for $C_{21}H_{24}N_2O_6$ (percent): C, 62.99; H, 6.04; N, 6.93. Found (percent): C, 62.94; H, 6.06; N, 6.85.

(b) Benzyloxycarbonyl-$\beta$-alanyl-L-tyrosine hydrazide

Benzyloxycarbonyl-$\beta$-alanyl-L-tyrosine methyl ester (4.81 g.) is dissolved in ethanol (50 ml.), and hydrazine (2.9 ml.) is added. The mixture is allowed to stand at room temperature for 2 to 3 hours and at 4° C. overnight. Crystalline hydrazide separated is collected by filtration, washed with cold ethanol and dried under reduced pressure to give the desired product (4.72 g.), which is treated with hot ethanol. M.P. 225–228° C., $[\alpha]_D^{26}+3.9\pm0.4°$ (c.=1.032, 50% acetic acid).

*Analysis.*—Calcd. for $C_{20}H_{24}N_4O_5$ (percent): C, 59.99; H, 6.04; N, 13.99. Found (percent): C, 60.09; H, 6.16; N, 13.97.

(c) Benzyloxycarbonyl-$\beta$-alanyl-L-tyrosyl-L-serine methyl ester

Benzyloxycarbonyl-$\beta$-alanyl-L-tyrosine hydrazide (2.40 g.) is dissolved in dimethylformamide (7 ml.), and to the solution is added N hydrochloric acid (15 ml.). The solution is cooled with ice and added with ice-cold 2 M sodium nitrite (3.6 ml.). The mixture is kept at 0° C. for 4 minutes, and the azide precipitated is extracted with ice-cold ethyl acetate (25 ml. ×2). The extracts are combined, washed with ice-cold 5% sodium hydrogen carbonate and dried over sodium sulfate. The resulting solution is added to a solution of L-serine methyl ester hydrochloride (0.93 g.) and triethylamine (0.84 ml.) in 90% tetrahydrofuran (20 ml.), and the mixture is stirred at 4° C. for 48 hours. Gelatinous precipitates are collected by filtration, washed with water, and dried under reduced pressure to give the desired product (1.58 g.), which is treated with hot ethanol; M.P. 195–196° C., $$[\alpha]_D^{26}-2.1\pm0.4°$$

(c.=1.091, methanol).

*Analysis.*—Calcd. for $C_{24}H_{29}N_3O_8$ (perecnt): C, 59.13; H, 6.00; N, 8.62. Found (percent): C, 59.29; H, 6.08; N, 8.63.

(d) Benzyloxycarbonyl-$\beta$-alanyl-L-tyrosyl-L-serine hydrazide

To a solution of benzyloxycarbonyl-$\beta$-alanyl-L-tyrosyl-L-serine methyl ester (1.46 g.) in dimethylformamide (5 ml.) is added hydrazide (0.73 ml.), and the mixture is allowed to stand at 4° C. for 24 hours to give crystalline hydrazide. After addition of ethanol, the crystals are collected by filtration, washed with ethanol and dried under reduced pressure to give the desired product (1.40 g.), which is treated with hot ethanol to give pure hydrazide (1.32 g.), melting at 220–224° C. (decomp.). $[\alpha]_D^{25}+15.7\pm0.5°$ (c.=1.042, glacial acetic acid).

*Analysis.*—Calcd. for $C_{23}H_{29}N_5O_7$ (percent): C, 56.66; H, 6.00; N, 14.37. Found (percent): C, 56.35; H, 6.04; N, 14.57.

(e) t-Butyloxycarbonyl-$\gamma$-benzyl-L-glutamyl-L-histidyl-L-phenylalanyl-L1arginyl-L-tryptophyl-glycine To a solution of L-histidyl-L-phenylalanyl-L-arginyl-L-tryptophyl-glycine acetate (1.20 g.) (prepared according to the method described in Bull. Chem. Soc. Japan 43 196 (1970)) in 50% dimethylformamide (10 ml.) are added t-butyloxycarbonyl-$\gamma$-benzyl-L-glutamic acid p-nitrophenyl ester (1.03 g.) and dimethylformamide (25 ml.), and the mixture is allowed to stand at 4° C. for 3 days.

The reaction mixture is dropwise added to a mixed solvent of ethyl acetate and ether (1:1 by volume, 200 ml.) and precipitates separated are collected by filtration. The precipitates are washed with ethyl acetate and ether, and dried under reduced pressure (yield 1.86 g.). The product is again dissolved in 50% acetic acid (about 10 ml.), and ethanol (about 100 ml.) is added. Precipitated mass is collected and lyophilized from acetic acid to give the desired product (1.37 g.). $[\alpha]_D^{22} -23.9 \pm 0.6°$ (c.=1.020, 50% acetic acid).

*Analysis.*—Calcd. for $C_{51}H_{64}N_{12}O_{11} \cdot CH_3COOH \cdot 3H_2O$ (percent): C, 56.07; H, 6.57; N, 14.81; $CH_3CO$, 3.79. Found (percent) C, 56.40; H, 6.22; N, 15.40; $CH_3CO$, 3.25.

(f) t-Butyloxycarbonyl-L-methionyl-γ-benzyl-L-glutamyl L-histidyl-L-phenylalanyl-L-arginyl-L-trypophy-glucine t-Butyloxycarbonyl-γ-benzyl-L-glutamyl-L-histidyl - L-phenylalanyl-L-arginyl-L-trytptophyl-glycine (1.26 g.) is dissolved in trifluoroacetic acid (6 ml.), and the solution is kept at room temperature for 30 minutes. The solution is cooled in an ice-bath, and ether is added. The resulting partly deblocked hexapeptide as precipitates (1.34 g.) is dissolved in dimethylformamide (10 ml.), and to the solution are added triethylamine (0.46 ml.) and t-butyl-oxycarbonyl-L-methionine p-ntrophenyl ester (0.74 g.). The mixture is kept at 4° C. for 24 hours and poured into ethyl acetate-ether (1:4 by volume, 250 ml.). Precipitates separated are collected by filtration, washed with ether, and dried under reduced pressure (yield 1.56 g.). The precipitates are suspended in ethanol (15 ml.), heated and cooled. The resulting precipitates are collected by filtration, washed with cold ethanol and ether, and lyophilized from ethyl acetate to give the desired product (1.16 g.). $[\alpha]_D^{22} -18.5 \pm 0.5°$ (c.=1.072, dimethylformamide).

*Analysis.*—Calcd. for $C_{56}H_{73}N_{13}O_{12}S \cdot CH_3COOH \cdot 2H_2O$ (percent): C, 54.23; H, 6.67; N, 14.18. Found (percent): C, 54.51; H, 6.16; N, 13.94.

(g) Benzyloxycarbonyl-β-alanyl-L-tyrosyl - L - seryl - L-methionyl-γ-benzyl-L-glutamyl-L-histidyl - L - phenylalanyl-L-arginyl-L-tryptophyl-glycine t-Butyloxycarbonyl-L-methionyl-γ-benzyl-L - glutamyl-L-histidyl-L-phenylalanyl-L-arginyl-L - trytophyl - glycine (1.09 g.) is, under ice-cooling, dissolved in trifluoroacetic acid (6 ml.) containing one drop of water. The reaction mixture is allowed to stand at room temperature for 30 minutes, and the resulting heptapeptide trifluoroacetate is precipitated by the addition of ether. The precipitates are collected by filtration, washed well with ether, and dried under reduced pressure (yield 1.21 g.).

A mixture of benzyloxycarbonyl-β-alanyl-L-tyrosyl-L-serine hydrazide (0.86 g.), N hydrochloric acid (4 ml.) and dimethylformamide (5 ml.) is cooled in an ice-bath, and ice-cold 2 M sodium nitrite (0.96 ml.) is dropwise added. The mixture is stirred at 0° C. for 4 minutes, and ice-cold dimethylformamide (10 ml.) is added to dissolve the precipitated azide. After addition of triethylamine (0.56 ml.), the resulting solution is added to a solution of heptapeptide trifluoroacetate obtained above and triethylamine (0.49 ml.) in ice-cold dimethylformamide (20 ml.). The reaction mixture is allowed to stand at 0° C. for 24 hours, and acetic acid (1 ml.) is added. The solvent is removed by evaporation under reduced pressure at a bath-temperature of 45° C. to give a sirupy residue, which is added with ethanol (20 ml.). The gelatinous mass precipitated is collected by filtration, washed thoroughly with ethanol, ethyl acetate and ether, and dried under reduced pressure (yield 0.88 g.). The filtrate and washes are combined and concentrated under reduced pressure to give a residue. The residue is dissolved in ethyl acetate, and insoluble precipitates are collected by filtration. The precipitates are heated in ethanol to the boiling point, cooled and filtered off (0.27 g.). Total yield amounts to 1.15 g. The combined precipitates are purified by treatment with hot ethanol.

$$[\alpha]_D^{22} -18.5 \pm 0.5°$$

(c.=1.067, dimethylformamide), $Rf=0.75$ (silica gel thin-layer chromatography in a solvent system of n-butanol - acetic acid - pyridine - water=30:6:20:24), $Rf=0.80$ (paper chromatography in a solvent system of n-butanol-acetic acid-water=4:1:2).

*Analysis.*—Calcd. for $$C_{74}H_{90}N_{16}O_{17}S \cdot 2CH_3COOH \cdot 3H_2O$$

(percent): C, 55.70; H, 6.23; N, 13.33. Found (percent): C, 55.71; H, 6.06; N, 13.34.

(h) $N^\alpha$-benzyloxycarbonyl-$N^\epsilon$-t-butyloxycarbonyl-L-lysyl-L-prolyl - L - valyl-glycyl-$N^\delta$-t-butyloxycarbonyl-L-ornithine methyl ester $N^\alpha$ - benzyloxycarbonyl - $N^\delta$ - t - butyloxycarbonyl-L-ornithine methyl ester [1.20 g., M.P. 69–70° C.

$$[\alpha]_D^{28} -10.6 \pm 0.5°$$

(c.=1.092, methanol)] is hydrogenated over palladium-black catalyst in methanol containing 10% acetic acid for 2 hours. Evaporation of the solvent under reduced pressure gives $N^\delta$-t-butyloxycarbonyl-L-ornithine methyl ester acetate as a sirupy residue, which is treated with 50% aqueous potassium carbonate in dichloromethane at 0° C. The organic layer is dried over sodium sulfate and evaporated under reduced pressure at a bath-temperature of 20° C. The resulting residue is dissolved in dichloromethane (10 ml.), and to the solution is added $N^\alpha$-benzyloxycarbonyl - $N^\epsilon$ - t - butyloxycarbonyl-L-lysyl-L-prolyl-L-valyl-glycine (1.83 g.) prepared according to the method described in Bull. Chem. Soc. Japan 37 1471 (1964). To the solution is added a solution of N,N'-dicyclohexylcarbodiimide (0.60 g.) in dichloromethane at 0° C. The mixture is allowed to stand at 4° C. for 2 days. After removal of dicyclohexylurea by filtration, the filtrate is concentrated under reduced pressure to give a sirupy residue. The residue is dissolved in ethyl acetate, washed with ice-cold N hydrochloric acid and M sodium bicarbonate, dried over sodium sulfate and concentrated under reduced pressure. The resulting residue is again dissolved in ethyl acetate (30 ml.) and added with ether (30 ml.) to give the desired pentapeptide methyl ester in a pure form. Yield 2.24 g. $[\alpha]_D^{26} -55.9 \pm 0.9°$ (c.=0.62, methanol).

*Analysis.*—Calcd. for $C_{42}H_{67}N_7O_{12}$ (percent): C, 58.52; H, 7.83; N, 11.37. Found (percent): C, 58.52; H, 8.08; N, 11.33.

(i) $N^\alpha$ - benzyloxycarbonyl-$N^\epsilon$-t-butyloxycarbonyl-L-lysyl-L - prolyl - L - valyl-glycyl-$N^\delta$-t-butyloxycarbonyl-L-ornithine hydrazide The pentapeptide methyl ester (2.2 g.) obtained above is dissolved in methanol (30 ml.), and hydrazine (0.26 ml.) is added. The reaction mixture is allowed to stand at room temperature for 3 days, and the hydrazide is precipitated by the addition of water. The precipitates are collected by filtration and crystallized from methanol-water to give the desired hydrazide (2.1 g.), melting at 175–180° C. $[\alpha]_D^{25} -35.8 \pm 0.7°$ (c.=1.040, dimethylformamide).

*Analysis.*—Calcd. for $C_{41}H_{67}N_9O_{11}$ (percent): C, 57.13; H, 7.83; N, 14.62. Found (percent): C, 57.01; H, 7.87; N, 14.41.

(j) $N^\alpha$ - benzyloxycarbonyl-$N^\epsilon$-t-butyloxycarbonyl-L-lysyl-L - prolyl - L - valyl-glycyl-$N^\delta$-t-butyloxycarbonyl-L-ornithyl - $N^\epsilon$ - t - butyloxycarbonyl-L-lysyl-L-arginyl-L-arginine amide diacetate To an ice-cold solution of the pentapeptide hydrazide (0.95 g.) obtained above in 90% tetrahydrofuran (10 ml.) are added ice-cold N hydrochloric acid (2.75 ml.) and 2 M sodium nitrite (0.61 ml.). The mixture is allowed to stand at 0° C. for 5 minutes and adjusted to pH 7.4–7.6 by the addition of triethylamine (0.38 ml.). To the solution are added an ice-cold solution of $N^\epsilon$-t-butyloxycarbonyl-L-lysyl-L-arginyl-L-arginine amide triacetate (derived from 0.92 mmole of $N^\alpha$-benzyloxycarbonyl-$N^\epsilon$-t-butyloxycarbonyl - L - lysyl - $N^G$ - nitro - L - arginyl-$N^G$ - nitro - L - arginine amide by catalytic hydrogenation according to the method described in Bull. Chem. Soc. Japan 39 882 (1966)) and triethylamine (0.42 ml.) in 80% tetrahydrofuran (7.5 ml.). The mixture is allowed to stand at 4° C. for 3 days and concentrated under reduced pressure. To the resulting residue are added ethyl acetate (10 ml.) and N acetic acid (10 ml.) and the mixture is shaken well. The aqueous phase is extracted three times with ethyl acetate, and the combined extracts are concentrated under reduced pressure to approximately 10 ml. The concentrate is thoroughly extracted with water-saturated n-butanol. The extract is dried over sodium sulfate and concentrated under reduced pressure. The resulting residue is lyophilized from acetic acid to give the desired product (0.85 g.). $[\alpha]_D^{22}$—43.1±1.5° (c.=0.540, 50% acetic acid).

*Analysis.*—Calcd. for $$C_{64}H_{110}O_{16}N_{18} \cdot 2CH_3COOH \cdot 4H_2O$$

(percent): C, 51.70; H, 8.04; N, 15.96; $CH_3CO$, 5.11. Found (percent): C, 51.60; H, 7.72; N, 15.62; $CH_3CO$, 4.30.

(k) β-Alanyl-L-tyrosyl-L-seryl-L-methionyl-L-glutamyl-L-histidyl - L - phenylalanyl-L-arginyl-L-tryptophyl-glycyl-L-lysyl - L - prolyl-L-valyl-glycyl-L-ornithyl-L-lysyl-L-arginyl-L-arginine amide To a solution of benzyloxycarbonyl-β-alanyl-L-tyrosyl-L - seryl - L - methionyl-γ-benzyl-L-glutamyl-L-histidyl-L-phenylalanyl - L - arginyl-L-tryptophyl-glycine (0.405 g.) in acetic acid (5 ml.) is added N hydrogen chloride in acetic acid (0.5 ml.), and the mixture is immediately lyophilized, followed by drying over sodium hydroxide pellets. The decapeptide hydrochloride thus obtained is dissolved in dimethylformamide (4 ml.) together with N-hydroxysuccinimide (0.104 g.), and to this solution is added a solution of N,N'-dicyclohexylcarbodiimide (0.186 g.) in dimethylformamide (2 ml.). The mixture is kept at 4° C. overnight. Dicyclohexylurea precipitated is removed by filtration, and the filtrate is poured into an ice-cold mixed solvent of ethyl acetate (50 ml.) and ether (50 ml.). The resulting precipitates are filtered off, washed with ethyl acetate and ether, and dried under reduced pressure to give the decapeptide active ester (0.435 g.).

$N^\alpha$ - benzyloxycarbonyl - $N^\epsilon$ - t-butyloxycarbonyl-L-lysyl - L - prolyl - L - valyl-glycyl-$N^\delta$-t-butyloxycarbonyl-L-ornithyl - $N^\epsilon$ - t - butyloxycarbonyl-L-lysyl-L-arginyl-L-arginine amide (0.230 g.) is hydrogenated over palladium as a catalyst in 90% methanol-containing acetic acid (0.1 ml.) for 3 hours. After removal of the catalyst, the filtrate is concentrated under reduced pressure to give a sirupy residue, which is lyophilized from acetic acid to yield 0.262 g. of powder. This product is dissolved in dimethylformamide (2 ml.), and triethylamine (0.2 ml.) is added. To the solution is added a solution of the decapeptide active ester (0.435 g.) obtained above in dimethylformamide (1.5 ml.), and the mixture is allowed to stand at 4° C. for 45 hours. Then, the reaction mixture is poured into ice-cold ethyl acetate (100 ml.), and the precipitates formed are collected by filtration. The precipitates are washed with ethyl acetate and ether, lyophilized from acetic acid, and dried over sodium hydroxide pellets under reduced pressure to give the crude protected octadecapeptide (0.662 g.).

The protected octadecapeptide (0.646 g.) is treated with hydrogen fluoride (about 10 ml.) at 0° C. for 60 minutes in the presence of anisole (0.6 ml.) and L-methionine (0.12 g.). After removal of hydrogen fluoride by evaporation, the residue is dissolved in ice-cold water, and the solution is washed with ethyl acetate. The solution is passed through a column (1.7 x 15 cm.) of Amberlite CG–400 (acetate form). The column is washed well with water, and the aqueous solution is pooled. The solution is concentrated to a small volume and lyophilized. The crude deblocked peptide (0.704 g.) is submitted to chromatography on a column (2.7 x 32 cm.) of carboxymethyl cellulose (Serva, 0.56 meq./g.) using an ammonium acetate buffer (pH 6.5, 2000 ml.) with a linear concentration gradient from 0.025–0.6 M. Ten-ml. fractions are collected, and the absorption at 280 mμ is recorded. The fractions corresponding to a main peak (tube Nos. 153–180) and its shoulder (tube Nos. 181–200) are separately collected, and the bulk of solvent is removed by evaporation under reduced pressure at a bath-temperature of 50–55° C. The residues are lyophilized to constant weights to give 228 mg. (F–I) and 62 mg. (F–II) of colorless fluffy powder from the former fractions and from the latter, respectively. F–I (228 mg.) is rechromatographed on a carboxymethyl cellulose column (2.2 x 27 cm.) in the same manner as above, and the purified peptide (195 mg., F–I-1) is obtained from a single peak. A small shoulder of the peak gives F–I-2 (20 mg.). F–II (62 mg.) and F–I-2 (20 mg.) are combined and the chromatographic purification is repeated twice to give an additional quantity of pure peptide (46 mg.). Total yield of the octadecapeptide thus obtained amounts to 241 mg.

$[\alpha]_D^{22}$—55.4° (c.=0.5, 0.1 N acetic acid), UV $\lambda_{max.}^{0.1\ N-HCl}$ =279 mμ ($E_{1cm.}^{1\%}$ 24.4), $\lambda_{shoulder}^{0.1\ N-HCl}$=288 mμ ($E_{1cm.}^{1\%}$ 17.8), $\lambda_{max.}^{0.1\ N-NaOH}$=281 mμ ($E_{1cm.}^{1\%}$ 25.9), 288 mμ ($E_{1cm.}^{1\%}$ 25.0).

Amino acid ratio in acid hydrolysate: serine 0.83, glutamic acid 0.96, proline 1.04, glycine 2.09, valine 1.00, methionine 1.03, tyrosine 1.03, phenylalanine 0.98, β-alanine 0.93, ornithine 1.11, lysine 1.95, histidine 0.97, arginine 3.07. The tryptopha/tyrosine ratio in the intact peptide was determined spectrophotometrically to be 1.15.

EXAMPLE 2

(a) t-Butyloxycarbonyl-β-alanine

β-Alanine (8.91 g.) is dissolved in N sodium hydroxide (100 ml.), and to this solution are added sodium hydrogen carbonate (21.0 g.) and dioxane (70 ml.). The solution is stirred at 50° C., and a solution of t-butylazide formate (17.2 g.) in dioxane (30 ml.) is dropwise added. The mixture is stirred for 41.5 hours at 50° C. and concentrated under reduced pressure to about 100 ml. The concentrate is cooled with ice and adjusted to pH 2 by the addition of 4 N hydrochloric acid (180 ml.). The solution is extracted with ice-cold ethyl acetate (about 100 ml.), dried over anhydrous sodium sulfate and concentrated under reduced pressure to give a sirupy residue. The residue is recrystallized from ethyl acetate-petroleum ether to give 12.66 g. of the desired product, melting at 77 to 78° C.

*Analysis.*—Calcd. for $C_8H_{15}NO_4$ (percent): C, 50.78; H, 7.99; N, 7.40. Found (percent): C, 50.99; H, 8.06; N, 7.47.

(b) t-Butyloxycarbonyl-β-alanyl-L-tyrosine methyl ester

L-tyrosine methyl ester hydrochloride (3.48 g.) is dissolved in water (15 ml.). To the solution is added 50% potassium carbonate (5 ml.) under ice-cooling, and the mixture is allowed to stand in a cold place for 40 minutes. The crystals separated are collected by filtration, washed thoroughly with cold water, and dried under reduced pressure to give 2.55 g. of L-tyrosine methyl ester.

On the other hand, t-butyloxycarbonyl-β-alanine (1.89 g.) is dissolved in anhydrous tetrahydrofuran, and the solution is cooled to −10° C. To the solution are slowly added successively tri-n-butylamine (2.04 g.) and ethyl chloroformate (1.19 g.) while stirring. After ten minutes, a suspension of L-tyrosine methyl ester (1.95 g.) obtained above in anhydrous tetrahydrofuran (20 ml.) is added. The mixture is stirred at −10° C. for 30 minutes and at room temperautre for 2.5 hours, and the solvent is removed by evaporation under reduced pressure. The resulting residue is dissolved in ethyl acetate, washed successively with N hydrochloric acid, water, 5% sodium hydrogen carbonate and water, and dried over sodium sulfate. After removal of the solvent by evaporation under reduced pressure, the resulting residue is added with ether to precipitate the crystals. The crystals separated are collected by filtration and dried under reduced pressure to yield 2.99 g. of the desired product. Recrystallization from methanol-ether gives the crystals, melting at 141 to 142° C. $[\alpha]_D^{23}$ +8.2±0.5° (c.=1.020, methanol).

*Analysis.*—Calcd. for $C_{18}H_{26}N_2O_6$ (percent): C, 59.00; H, 7.15; N, 7.65. Found (percent): C, 59.03; H, 7.12; N, 7.63.

(c) t-Butyloxycarbonyl-β-alanyl-L-tyrosine hydrazide t-Butyloxycarbonyl-β-alanyl - L - tyrosine methyl ester (2.56 g.) is dissolved in anhydrous ethanol (26 ml.). Hydrazine hydrate (1.7 ml.) is added to the solution, and the mixture is kept at room temperature for 5 hours and in a cold place overnight. The crystals formed are collected by filtration, washed with ethanol and ether, and dried to yield 2.54 g. of the desired product. Recrystallization from hot water gives crystals, melting at 213.5 to 215° C. $[\alpha]_D^{23}$ +3.6±0.6° (c.=0.978, 50% acetic acid).

*Analysis.*—Calcd. for $C_{17}H_{16}N_4O_5$ (percent): C, 55.72; H, 7.15; N, 15.29. Found (percent): C, 55.74; H, 7.11; N, 15.30.

(d) t-Butyloxycarbonyl-β-alanyl-L-tyrosyl-L-seryl-L-methionine methyl ester t-Butyloxycarbonyl-β-alanyl-L-tyrosine hydrazide (1.10 g.) is dissolved in cold N hydrochloric acid (7.5 ml.). The solution is kept at about −10° C., and cold 2 M sodium nitrite (3.6 ml.) is added thereto. After the mixture is allowed to stand for 4 minutes the azide formed is extracted with ether, washed with cold M sodium hydrogen carbonate and dried over anhydrous sodium sulfate. After removal of the solvent by evaporation under reduced pressure at a bath-temperature of about 10° C., the resulting residue is dissolved in cold acetonitrile. To the solution is added L-seryl-L-methionine methyl ester (0.756 g.) (prepared according to the method described in Bull. Chem. Soc. Japan 39 1171 (1966)), and the mixture is allowed to stand for 48 hours. After removal of the solvent by evaporation under reduced pressure, the residue is dissolved by the addition of ethyl acetate and a small amount of water. The solution is washed successively with cold N hydrochloric acid, water, 5% sodium hydrogen carbonate and water, and dried over sodium sulfate. After removal of the solvent by evaporation under reduced pressure, the resulting gelatinous mass is collected by filtration, washed with cold ethyl acetate and ether, and dried to give the desired product in a yield of 1.204 g. The product is purified by reprecipitation from ethyl acetate; M.P. 121.5 to 123° C., $[\alpha]_D^{23}$ −13.0±0.6° (c.=0.997, methanol).

$Rf$=0.53 (silica gel thin-layer chromatography in a solvent system of methanol-acetic acid=15:85 by volume).

*Analysis.*—Calcd. for $C_{26}H_{40}N_4O_9S$ (percent): C, 52.41; H, 6.90; N, 9.58, S, 5.48. Found (percent): C, 52.94; H, 6.85; N, 9.65; S, 5.48.

(e) t-Butyloxycarbonyl-β-alanyl-L-tyrosyl-L-seryl-L-methionine hydrazide t-Butyloxycarbonyl - β - alanyl - L - tyrosyl - L - seryl-L-methionine methyl ester (0.969 g.) is dissolved in dimethylformamide (6 ml.). To the solution is added hydrazine hydrate (0.5 ml.), and the mixture is allowed to stand in a cold place for about 43 hours. The solution is added with ethyl acetate to give a gelatinous substance, which is collected by filtration, washed with cold ethyl acetate and dried to yield 1.01 g. of the desired product. Recrystallization from water gives the crystals, melting at 186.5 to 188° C. $[\alpha]_D^{23}$ −20.1±0.5° (c.=1.346, 50% methanol).

*Analysis.*—Calcd. for $C_{25}H_{40}O_8N_6S·H_2O$ (percent): C, 49.82; H, 7.02; N, 13.94; S, 5.32. Found (percent): C, 49.72; H, 7.05; N, 14.50; S, 5.15.

(f) t-Butyloxycarbonyl-β-alanyl-L-tyrosyl - L - seryl-L-methionyl-γ-t-butyl-L-glutamyl-L-histidyl - L - phenylalanyl-L-arginyl-L-tryptophyl-glycine t-Butyloxycarbonyl - β - alanyl - L - tyrosyl - L - seryl-L-methionine hydrazide (0.452 g.) is dissolved in 90% dimethylformamide (4.5 ml.), and the solution is cooled in an ice-salt bath. To the solution are added ice-cold N hydrochloric acid (2.0 ml.) and M sodium nitrite (0.825 ml.) while stirring. After about 4 minutes, an ice-cold solution (20 ml.) saturated with sodium chloride is added and the t-butyloxycarbonyl-tetrapeptide azide is extracted withs ice-cold ethyl acetate. The extract is washed with ice-cold 5% sodium hydrogen carbonate and dried over anhydrous sodium sulfate.

γ-t-Butyl-L-glutamyl-L-histidyl - L - phenylalanyl-L-arginyl-L-tryptophyl-glycine acetate (0.496 g.) (prepared according to the method described in Bull. Chem. Soc. Japan 38 1148 (1965)) and triethylamine (0.21 ml.) are dissolved in dimethylformamide (15 ml.). To this solution is added a solution of the azide obtained above in ethyl acetate, and the ethyl acetate is removed by evaporation under reduced pressure at a bath-temperature of 10–15° C. to give a clear solution, which is allowed to stand in a cold place overnight. An additional quantity of the azide prepared from the tetrapeptide hydrazide (0.226 g.) as mentioned above is added to the solution, and the mixture is allowed to stand overnight in a cold place.

Subsequently, the mixture is added dropwise to ice-cold ethyl acetate (200 ml.) while stirring. The precipitates formed are collected by filtration to give 0.691 g. of the crude decapeptide derivative, which is reprecipitated from dimethyl-formamide-methanol (2:5 by volume) and lyophilized from acetic acid to yield powder in a yield of 0.454 g.

The silica gel thin-layer chromatography of the product gives a single spot of $Rf$ value (0.54 to 0.57). The product has a specific optical rotation of $[\alpha]_D^{23}$ −19.4±0.7° (c.=0.882, dimethylformamide).

*Analysis.*—Calcd. for $C_{68}H_{94}N_{16}O_{17}S·8H_2O$ (percent): C, 51.57; H, 7.00; N, 14.15; S, 2.02. Found (percent): C, 51.62; H, 6.66; N, 14.06; S, 2.64.

In a similar manner as that described in Example 1(k), t-butyloxycarbonyl - β - alanyl - L - tyrosyl - L - seryl - L-methionyl - γ - t - butyl-L-glutamyl-L-histidyl-L-phenylalanyl-L-arginyl-L-tryptophylglycine is condensed with $N^\epsilon$-t-butyloxycarbonyl-L-lysyl-L-prolyl - L - valyl-glycyl-$N^\delta$-t-butyloxycarbonyl-L-ornithyl-$N^\epsilon$-t - butyloxycarbonyl-L-lysyl-L-arginyl-L-arginine amide and the resulting protected octadecapeptide is treated with hydrogen fluoride to give the deblocked octadecapeptide. After chromatographic purification of the product, β-alanyl-L-tyrosyl-L-seryl-L-methionyl-L-glutamyl-L-histidyl-L - phenylalanyl-L-arginyl-L-triptophyl-glycyl-L-lysyl-L-prolyl - L - valyl-glycyl-L-ornithyl-L-lysyl-L-arginyl-L-arginine amide is obtained in a pure form. This product was identical with the octadecapeptide obtained in Example 1(k) in $[\alpha]_D$, UV, amino acid ratios and biological properties.

EXAMPLE 3

[β-Ala$^1$,Orn$^{15}$]—ACTH(1–18)—NH$_2$ acetate (0.5 mg.) is dissolved in 40 mM. zinc chloride (0.25 ml.) at room temperature, and to this solution is added a solution (0.25 ml.) of 40 mM. disodium hydrogenphosphate containing sodium chloride (4.5 mg.). Thus, a suspension of the desired complex is obtained, and it is adjusted to pH 7.0 by the addition of 0.1 N sodium hydroxide.

EXAMPLE 4

[β-Ala$^1$,Orn$^{15}$]—ACTH(1–18)—NH$_2$ acetate (0.5 mg.) is dissolved in distilled water (0.15 ml.). To the solution is added a solution (0.1 ml.) of poly-L-glutamic acid (0.5 mg.; molecular weight-about 1,500–2,000) which has been previously neutralized with 0.1 N sodium hydroxide. The mixture is stirred for several minutes, and to this is added a solution (0.25 ml.) of M/30 phosphate buffer containing sodium chloride (4.5 mg.). The resulting complex preparation is adjusted to pH 7.0 with 0.1 N sodium hydroxide.

EXAMPLE 5

[β-Ala$^1$,Orn$^{15}$]—ACTH(1–18)—NH$_2$ acetate (1.0 mg.) is dissolved in distilled water (0.2 ml.). To the solution is added, while stirring, a solution of poly-L-aspartic acid (2 mg.; molecular weight=about 3,000) which has been neutralized with 0.1 N sodium hydroxide (0.3 ml.) before use, and thus a suspension of white precipitates is formed. The desired suspension of the complex is prepared by adding to the suspension a solution (0.5 ml.; pH 6.8) of M/15 disodium hydrogenphosphate/potassium dihydrogenphosphate containing sodium chloride (9.0 mg.) and adjusting the suspension to pH 7.0 with 0.1 N sodium hydroxide.

EXAMPLE 6

[β-Ala$^1$,Orn$^{15}$]—ACTH(1–18)—NH$_2$ acetate (0.5 mg.) is dissolved in 100 mM. zinc chloride (0.15 ml.). On the other hand, poly-L-glutamic acid (0.5 mg.; molecular weight=about 2,000–3,000) is neutralized with 0.1 N sodium hydroxide (0.1 ml.), and to the solution is added sodium chloride (4.5 mg.) and 40 mM. disodium hydrogenphosphate (0.25 ml.). Thus obtained solutions are combined and stirred at room temperature to make a suspension of the desired complex, which is neutralized with an appropriate amount of 0.1 N sodium hydroxide.

EXAMPLE 7

[β-Ala$^1$,Orn$^{15}$]—ACTH(1–18)—NH$_2$ acetate (0.5 mg.) is dissolved in water (0.1 ml.) at room temperature, and to this is added M/15 potasium dihydrogenphosphate-disodium hydrogenphosphate (0.25 ml.) contaianing 4.5 mg. of sodium chloride. Copoly-L-glutamyl-L-tyrosine (2.0 mg.) (molecular weight=21,850 is neutralized by the addition of 0.1 N sodium hydroxide (0.15 ml.). The neutralized solution is added to the peptide solution obtained above and the mixture is stirred to make a suspension of the desired complex, which is adjusted to pH 7.0 with 0.1 N sodium hydroxide.

EXAMPLE 8

[β-Ala$^1$, Orn$^{15}$]—ACTH(1–18)—NH$_2$ acetate (0.5 mg.) is dissolved in water (0.1 ml.), and to this is added M/15 phosphate buffer (0.25 ml.) containing 4.5 mg. of sodium chloride. Copoly-L-glutamyl-L-tyrosine (7 mg.; molecular weight=about 21,850) is neutralized with 0.1 N sodium hydroxide. The neutralized solution (0.1 ml.) is added to the solution of peptide obtained above to give a suspension, which immediately becomes clear. To the solution is added thimerosal (0.1 mg.) in water (0.05 ml.), and the resulting clear solution is adjusted to pH 7.0 by the addition of 0.1 N sodium hydroxide.

What we claim is:

1. A member selected from the group consisting of octadecapeptides represented by the formula β-alanyl-L-tyrosyl-L-seryl - L - methionyl-L-glutamyl-L-histidyl - L-phenylalanyl - L - arginyl-L-tryptophyl-glycyl-L-lysyl-L-prolyl - L - valyl-glycyl-L-ornithyl-L-lysyl-L-arginyl - Z wherein Z is a member selected from the group consisting of an L-arginine residue, an L-arginine ester residue and an L-arginine amide residue, non-toxic acid addition salts thereof and complexes thereof.

2. A member selected from the group consisting of an octadecapeptide represented by the formula β-alanyl-L-tyrosyl-L-seryl-L-methionyl - L - glutamyl - L - histidyl-L-phenylalanyl - L - arginyl - L - tryptophyl-glycyl-L-lysyl-L-prolyl - L - valyl - glycyl-L-ornithyl-L-lysyl-L-arginyl-L-arginine amide, non-toxic acid addition salts thereof and complexes thereof.

References Cited

UNITED STATES PATENTS

| | | | |
|---|---|---|---|
| 3,651,039 | 3/1972 | Fujino et al. | 260—112.5 |
| 3,352,844 | 11/1967 | Boissonnas et al. | 260—112.5 |
| 3,345,354 | 10/1967 | Kappeler et al. | 260—112.5 |
| 3,300,468 | 1/1967 | Schwyzer et al. | 260—112.5 |

FOREIGN PATENTS

| | | |
|---|---|---|
| 5,849 | 1/1967 | France. |
| 92,369 | 11/1966 | France. |

OTHER REFERENCES

Li et al., J. Am. Chem. Soc., 86, 2711 (1964).
Otsuka et al., Bull. Chem. Soc. Japan, 43, 196 (1970).
Rittel et al., Chem. Abstr., 71, 113253u (1968), taken from S. African Pat. 667,644 (Apr. 24, 1968).
Rittel, Chem. Abstr., 70, 4588r (1967), taken from Advan. Exp. Med. Biol., 1967, p. 35.

LEWIS GOTTS, Primary Examiner

R. J. SUYAT, Assistant Examiner

U.S. Cl. X.R.
424—179